US011500987B2

(12) United States Patent
Hasumi et al.

(10) Patent No.: US 11,500,987 B2
(45) Date of Patent: Nov. 15, 2022

(54) INCIDENT EFFECT RANGE ESTIMATION DEVICE, INCIDENT EFFECT RANGE ESTIMATION METHOD, STORAGE MEDIUM, AND SYSTEM

(71) Applicant: NEC CORPORATION, Tokyo (JP)

(72) Inventors: Daichi Hasumi, Tokyo (JP); Satoshi Ikeda, Tokyo (JP); Shigeyoshi Shima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 844 days.

(21) Appl. No.: 16/345,555

(22) PCT Filed: Oct. 20, 2017

(86) PCT No.: PCT/JP2017/038022
§ 371 (c)(1),
(2) Date: Apr. 26, 2019

(87) PCT Pub. No.: WO2018/079439
PCT Pub. Date: May 3, 2018

(65) Prior Publication Data
US 2019/0319974 A1    Oct. 17, 2019

(30) Foreign Application Priority Data

Oct. 27, 2016 (JP) .............................. JP2016-210763

(51) Int. Cl.
*G06F 21/56* (2013.01)
*H04L 45/121* (2022.01)
(Continued)

(52) U.S. Cl.
CPC .......... *G06F 21/566* (2013.01); *H04L 45/121* (2013.01); *H04L 45/306* (2013.01);
(Continued)

(58) Field of Classification Search
CPC ...... G06F 21/566; G06F 16/951; G06F 16/90; G06F 21/56; G06F 21/552; G06F 21/55;
(Continued)

(56) References Cited

U.S. PATENT DOCUMENTS 9,363,149 B1 *   6/2016   Chauhan .............. H04L 63/1416
9,444,829 B1 *   9/2016   Ashley ................ H04L 63/1416
(Continued)

FOREIGN PATENT DOCUMENTS

JP    2006-302170 A    11/2006
JP    2008-040745 A    2/2008
(Continued)

OTHER PUBLICATIONS

Independent Administrative Institution of Information-Technology Promotion Agency, Japan, "Cyber Rescue Team (J-CRAT) Analysis Report, 2015, Analysis of Attack Campaign Persistently Aiming at Specific Industry", pp. 1-31, Internet URL:https://www.ipa.go.jp/files/000053445.pdf.

(Continued)

*Primary Examiner* — Kyung H Shin
(74) *Attorney, Agent, or Firm* — Sughrue Mion, PLLC (57) ABSTRACT

Provided is an incident effect range estimation device which estimates the range of the effect of an incident and shortens incident handling time. This incident effect range estimation device is provided with an incident origin log acquisition unit which acquires log information for the incident-originating device which is related to the occurrence of the incident, a communication destination log acquisition unit which acquires, on the basis of the log information for the incident-originating device, log information for a communication destination device which is the communication destination of the incident-originating device, and an effect range estimation unit which estimates the range of the effect of the incident on the basis of the communication destination device. The range of the effect of the incident can thereby be estimated automatically, and thus incident handling time can be shortened significantly.

13 Claims, 9 Drawing Sheets

(51) Int. Cl.
  *H04L 45/302* (2022.01)
  *H04L 45/00* (2022.01)
  *H04L 9/40* (2022.01)

(52) U.S. Cl.
  CPC .......... *H04L 45/70* (2013.01); *H04L 63/1416* (2013.01); *H04L 63/1425* (2013.01)

(58) Field of Classification Search
  CPC .............. G06F 21/577; H04L 63/1425; H04L 63/1416; H04L 63/1491; H04L 63/145; H04L 67/36; H04L 63/1408; H04L 43/045; H04L 41/22
  See application file for complete search history.

(56) References Cited

U.S. PATENT DOCUMENTS

2008/0086773 A1* 4/2008 Tuvell ................ G06F 21/552
                                                              726/23
2017/0054742 A1* 2/2017 Matsumoto ........... G06F 21/566

FOREIGN PATENT DOCUMENTS

| | | |
|---|---|---|
| JP | 2009-253403 A | 10/2009 |
| JP | 2012-099067 A | 5/2012 |
| JP | 2013-105473 A | 5/2013 |
| JP | 2016-184870 A | 10/2016 |
| WO | 2015/097889 A1 | 7/2015 |

OTHER PUBLICATIONS

International Search Report for PCT/JP2017/038022 dated Dec. 26, 2017 [PCT/ISA/210].

Written Opinion for PCT/JP2017/038022 dated Dec. 26, 2017 [PCT/ISA/237].

Ponemon Institute, "Year 2015, Examination Related to Cost Generated at Time of Information Leak: Global Analysis", May 2015, pp. 1-31, Internet URL: https://www.ibm.com/downloads/cas/MYVPARAO.

Japanese Office Action for JP Application No. 2018-547628 dated Nov. 30, 2021 with English Translation.

* cited by examiner

| CLASSIFICATION OF INCIDENT | TYPE OF LOG (COMMUNICATION TERMINAL) TO BE ACQUIRED | ACQUISITION FREQUENCY | ANALYSIS METHOD |
|---|---|---|---|
| NORMAL | COMMUNICATION DESTINATION, SECURITY RELATED LOG | HALF DAY | HELD BY TERMINAL |
| EXAMINATION REQUIRED STAGE | NORMAL + (EVENT LOG, PREFETCH, REGISTRY SERVICE LIST, ACTIVATION PROCESS LIST, USER OPERATION LOG) | 1 HOUR | EVENT LOG, TRACES OF ACTIVATION OF EXECUTION FILE, CHANGE POINT IN ACTIVATION PROCESS |
| TARGETED ATTACK / HIGH POSSIBILITY OF PAST INFECTION | NORMAL + (SMFT) | 10 MINUTES | CLOSE EXAMINATION OF FILE SYSTEM |
| TARGETED ATTACK / HIGH PROBABILITY OF BEING CURRENTLY PROGRESSING | NORMAL + (CPU/RAM USE RATE, MEMORY DUMP, COMMUNICATION AMOUNT) | REAL TIME | FIND HINT OF DATA LEAK BY MONITORING CPU USE RATE AND COMMUNICATION AMOUNT |
| BOT INFECTION / HIGH PROBABILITY OF BEING CURRENTLY PROGRESSING | NORMAL + (COMMUNICATION ATTEMPT DESTINATION) | REAL TIME | ISOLATE INFECTED TERMINAL FROM NETWORK. MONITOR CHANGE IN OTHER TERMINALS AND NETWORK |
| ... | | | |

INCIDENT EFFECT RANGE ESTIMATION DEVICE, INCIDENT EFFECT RANGE ESTIMATION METHOD, STORAGE MEDIUM, AND SYSTEM

CROSS REFERENCE TO RELATED APPLICATIONS

This application is a National Stage of International Application No. PCT/JP2017/038022 filed Oct. 20, 2017, claiming priority based on Japanese Patent Application No. 2016-210763 filed Oct. 27, 2016.

TECHNICAL FIELD

The present invention relates to an incident effect range estimation device, an incident effect range estimation method, an incident effect range estimation program, and an incident effect range estimation system. Particularly, the present invention relates to an incident effect range estimation device, an incident effect range estimation method, an incident effect range estimation program, and an incident effect range estimation system that estimate an extent of influence of an incident.

BACKGROUND ART

In recent years, information security countermeasures in network systems are becoming an increasingly important problem. An event that may pose a threat in terms of information security is called an incident, and studies on incident management to be performed against occurrence of an incident are advanced (e.g., refer to NPLs 1 and 2).

As other related techniques, for example, PTLs 1 to 4 are known. PTLs 1 and 2 disclose a method. In this method, a type and a quantity of each log are set, for a predetermined entity concerning a change of an acquisition amount of logs, in a group including a role and the like of a user. A log according to the set type and quantity is acquired, thereby reducing storage capacity of logs.

PTL 3 discloses a method of detecting a related log among collected logs, in relation to the same user or a user action, in which a setting of an agent installed on a terminal side can be changed from a management device. PTL 4 discloses a method of transmitting, to a terminal side, a setting change of log collection, according to a preset log level, based on incident information transmitted from the terminal side, and controlling a flow rate of logs.

CITATION LIST

Patent Literature

[PTL 1] Japanese Unexamined Patent Application Publication No. 2008-040745
[PTL 2] Japanese Unexamined Patent Application Publication No. 2013-105473
[PTL 3] Japanese Unexamined Patent Application Publication No. 2006-302170
[PTL 4] Japanese Unexamined Patent Application Publication No. 2009-253403

Non Patent Literaure

[NPL 1] Ponemon Institute, "Year 2015, Examination Related to Cost Generated at Time of Information Leak: Global Analysis", Internet <URL:http://www-06.ibm-.com/jp/press/2015/06/Ponemon_Institute.pdf>
[NPL 2] Independent Administrative Institution of Information-technology Promotion Agency, Japan, "Cyber Rescue Team (J-CRAT) Analysis Report, 2015, Analysis of Attack Campaign Persistently Aiming at Specific Industry", Internet <URL:https://www.ipa.go.jp/files/000053445.pdf>

SUMMARY OF INVENTION

Technical Problem

Recently, there have occurred many targeted attacks. The attacks illegally invade a terminal or a network of a company or a government, thereby bringing technical information or personal information out and inflicting damage on a target company or a government, or thereby interrupting an operation thereof. Such a targeted attack is generally performed aiming at vulnerability of a system or vulnerability related to cognition and decision of a person. For this reason, it is difficult to completely prevent the attack by conventional exit-countermeasure type security products. Actually, there is also a report that it takes 206 days to detect a targeted attack and 69 days to deal with the attack (refer to NPL 1), and a new prompt countermeasure is needed inside an organization network.

Handling after incident detection is called incident handling (incident response), and activities are taken for minimizing damage caused by the incident, and quickly restoring a system. However, in related techniques up to this point, although quick handling is required, most of work is performed manually by an analyst and a handling person. Thus, it takes time to specify an extent of influence of the incident, and there is an issue that it takes a huge amount of time for incident handling.

In view of such an issue, an object of the present invention is to provide an incident effect range estimation device, an incident effect range estimation method, an incident effect range estimation program, and an incident effect range estimation system. These device, method, program, and system estimate an extent of influence of an incident, thereby enabling time for incident handling to be shortened.

Solution to Problem

An incident effect range estimation device according to this invention includes:
an occurrence-source-log acquisition means that acquires log information of an occurrence source device related to occurrence of an incident;
a communication-destination-log acquisition means that acquires, based on the log information of the occurrence source device, log information of a communication destination device being a communication destination of the occurrence source device; and
an effect range estimation means that estimates an extent of influence of the incident, based on the log information of the communication destination device.

An incident effect range estimation method according to this invention in an incident effect range estimation device, the method includes,
by the incident effect range estimation device:
acquiring log information of an occurrence source device related to occurrence of an incident;

acquiring, based on the log information of the occurrence source device, log information of a communication destination device being a communication destination of the occurrence source device; and estimating an extent of influence of the incident, based on the log information of the communication destination device.

An incident effect range estimation program according to this invention for causing a computer to perform incident effect range estimation processing, the incident effect range estimation processing including:

acquiring log information of an occurrence source device related to occurrence of an incident;

acquiring, based on the log information of the occurrence source device, log information of a communication destination device being a communication destination of the occurrence source device; and estimating an extent of influence of the incident, based on the log information of the communication destination device.

The incident effect range estimation program can be stored in non-transitory computer readable storage media.

Advantageous Effects of Invention

EXAMPLE EMBODIMENT (Prerequisite Technique)

Figure 1:
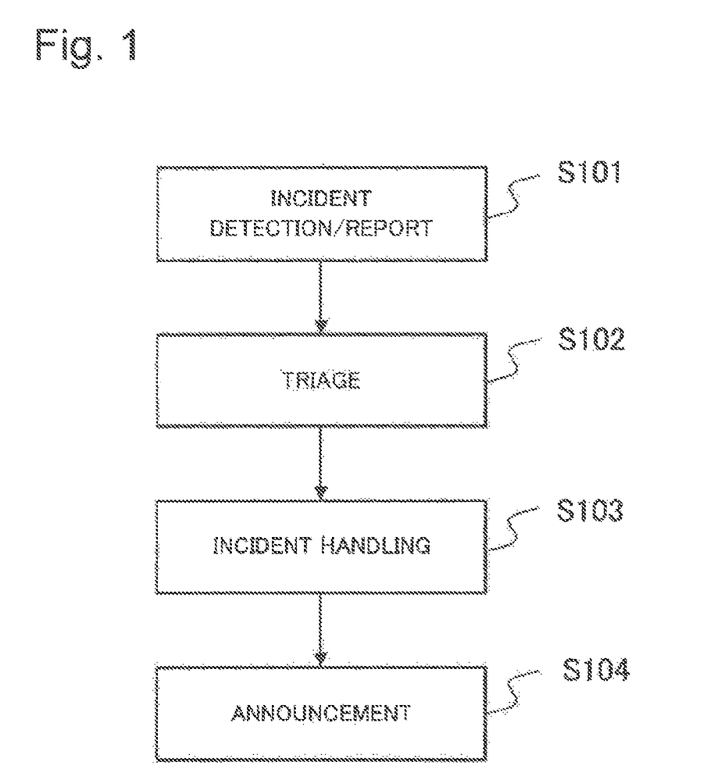
FIG. 1 is a flowchart illustrating a flow of incident handling that is a prerequisite of an example embodiment of the present invention.

With reference to FIG. 1, a description is made on a flow of incident handling that is a premise technique of an example embodiment. As illustrated in FIG. 1, in incident handling, for example, when detecting (recognizing) occurrence of an incident, a maintenance person of a system reports to an analyst that the incident occurs (S101). The analyst who receives the report from the maintenance person performs triage of the incident, based on contents of the report (S102). In the triage, the analyst analyzes information acquired in relation to the incident, and determines priority levels (prioritization) and an extent of influence for specifying a target of incident handling (response).

Depending on a result analyzed by the analyst, a handling person performs incident handling on the incident to be handled (S103). In the incident handling, the handling person analyzes an event, in detail, in a range of a high priority level to be handled, grasps a situation, studies a handling policy, determines a handling plan, and implements a handling activity. Further, following the incident handling or concurrently with the incident handling, announcement is performed as necessary (S104). Information is unfolded inside an organization in order to share information concerning the incident, and guidelines and policies of the organization are revised. To an outside of the organization, a media report, a press release, a report to a government, and the like are performed.

In such incident handling, as described above, an activity for minimizing damage caused by an incident and quickly restoring a system is required. However, at present, even when traces of an attack are acquired by a log and the like, it is difficult to grasp overall aspects of the incident. The report of the Information-technology Promotion Agency, Japan (IPA) (refer to NPL 2) also reports that a mechanism for acquiring log trails is as important as protection.

In dealing with an incident and restoring, in the present situation, a handling person manually determines isolation of an infected terminal from a network (and also performs work of the isolation, depending on a case). Further, the handling person implements confinement of invasion and restoration, and thus, in some cases, it takes time, and a handling mistake or the like occurs.

In the above-described series of incident handling steps, the inventors of the present invention paid attention particularly to triage, and found issues thereof. In other words, since a terminal group (effect range) that has to be examined by an incident handling person (analyst) is unclear, there is an issue that it takes time for triage, and as a result, it takes time for incident handling. Further, in any situation, accuracy of examination at a time of triage becomes higher as a log is collected in more detail. However, there also occurs an issue that a log amount becomes enormous, and for this reason, on the contrary, a burden is laid on the analyst. In view of the above, in order to resolve these issues, the following example embodiment enables an extent of influence of an incident to be automatically estimated.

(Outline of Example Embodiment)

Figure 2:
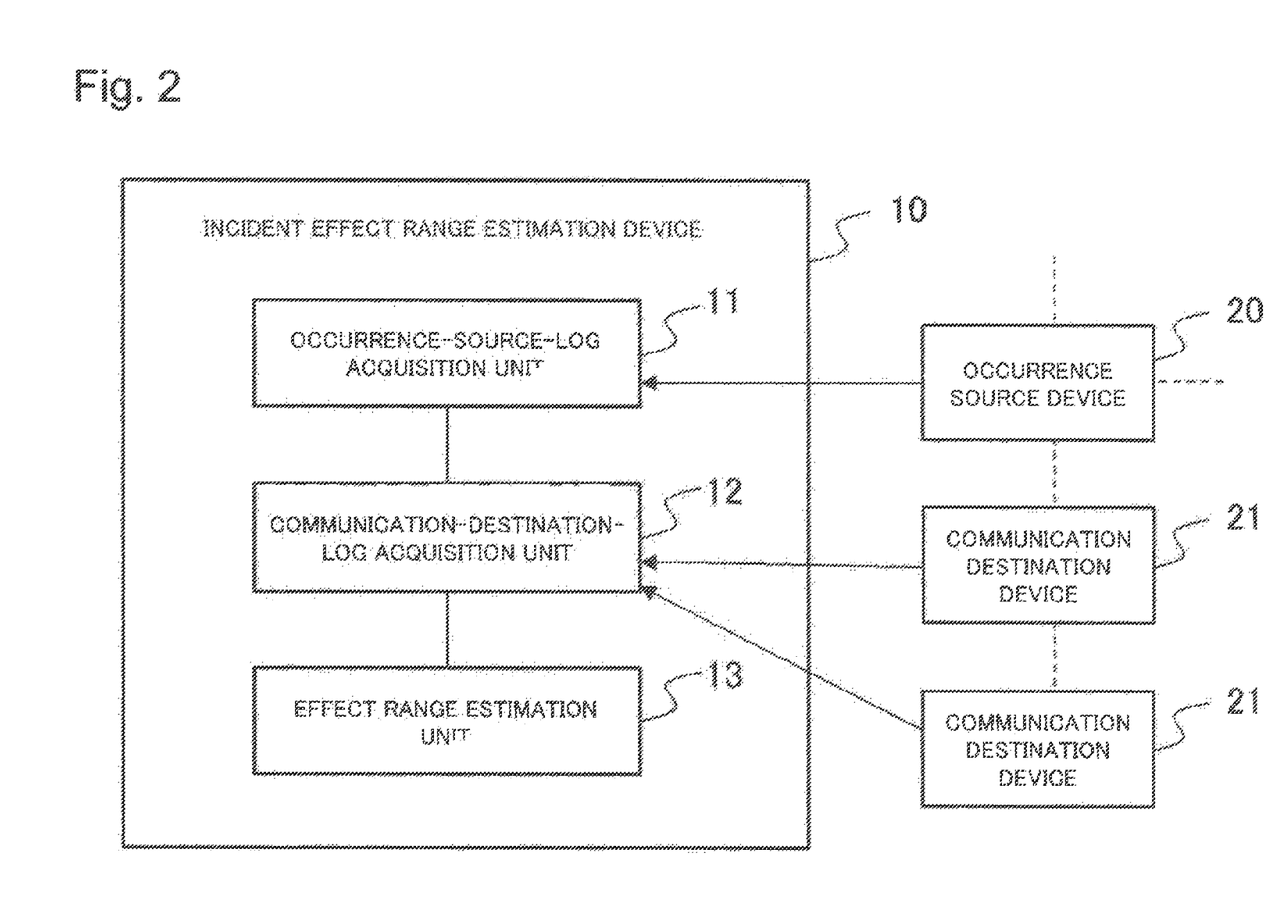
FIG. 2 is a configuration diagram illustrating an outline configuration of an incident effect range estimation device according to the example embodiment of the present invention.

With reference to FIG. 2, a description is made on an outline of an incident effect range estimation device according to an example embodiment. As illustrated in FIG. 2, incident effect range estimation device 10 according to the example embodiment includes, as main constituents, occurrence-source-log acquisition unit 11, communication-destination-log acquisition unit 12, and effect range estimation unit 13.

Occurrence-source-log acquisition unit 11 acquires log information of occurrence source device 20 related to occurrence of an incident. Based on the log information of occurrence source device 20, communication-destination-log acquisition unit 12 acquires log information of communication destination device 21 that is a communication destination of occurrence source device 20. Further, based on the acquired log information, communication-destination-log acquisition unit 12 may recursively repeat acquisition of log information of next communication destination device 21 that is a next communication destination. Based on the log information of communication destination device 21, effect range estimation unit 13 estimates an extent of influence of an incident.

With such a configuration, an extent of influence of an incident can be automatically estimated, which has been difficult so far. Accordingly, a range to be examined can be quickly grasped, and time for incident handling can be greatly shortened.

Examples of a threat that causes heavy damage and is difficult to handle include infection-spreading behavior (lateral movement) of a targeted attack, and a bot. The lateral movement is a threat in which malware that has succeeded in invasion attempts to expand the number of infected terminals in an internal network. The bot is a threat in which infected terminals construct a bot network and can be remotely controlled from an outside. In the case of infection by malware aiming at the lateral movement or by bot, it is effective to disinfect a plurality of infected devices simultaneously. There is a characteristic that infected devices always communicate with each other. For this reason, in the example embodiment, by using this characteristic, a communication destination is specified based on a log (and a log is acquired), thereby, an extent of influence is estimated. Further, a communication destination is specified (and a log is acquired) recursively, and thereby, an extent of influence is estimated. Accordingly, a plurality of devices with a high possibility of being infected can be set as targets of incident handling, and simultaneous disinfecting can be made.

Example Embodiment 1

Figure 3:
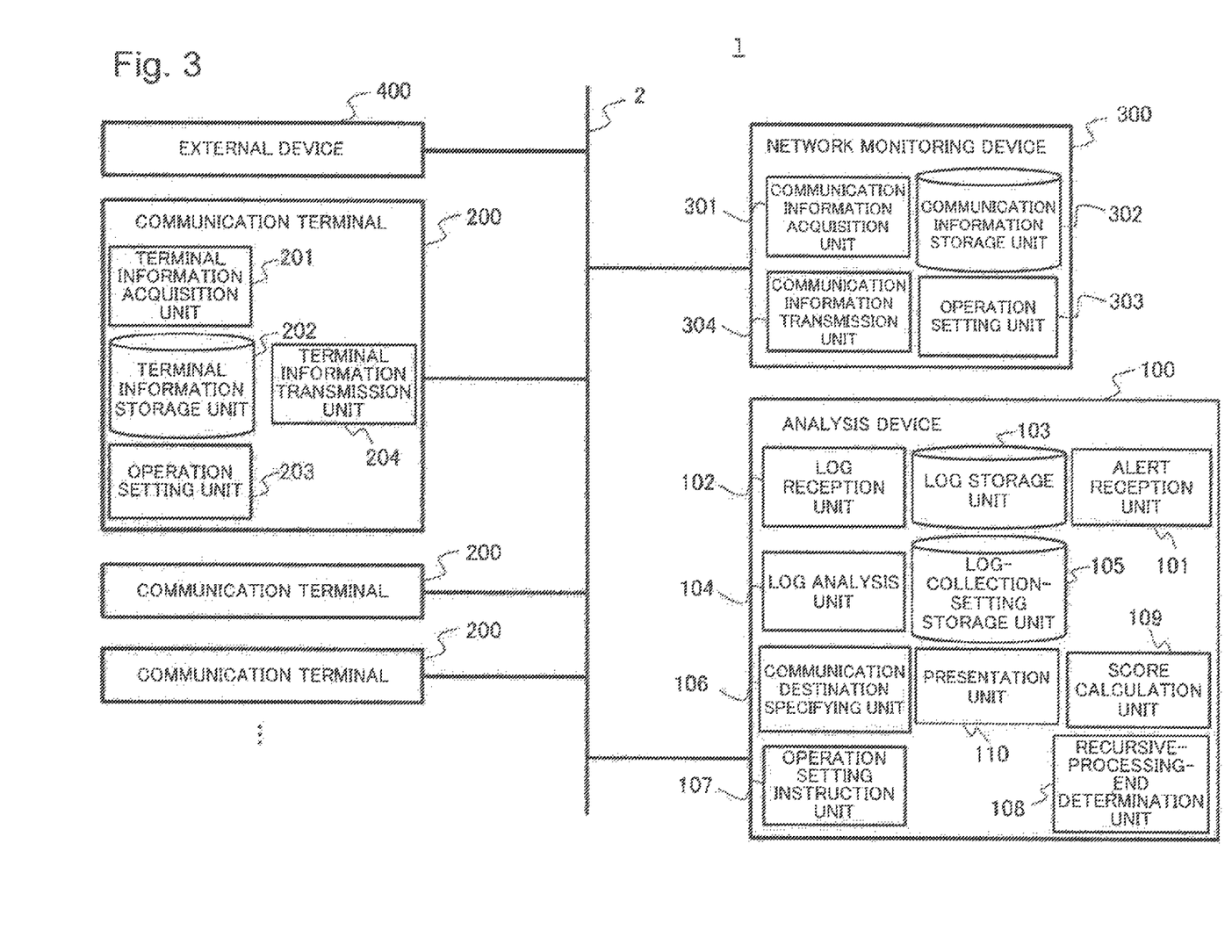
FIG. 3 is a configuration diagram illustrating a configuration example of a network system according to an example embodiment 1 of the present invention.

Hereinafter, an example embodiment 1 is described with reference to the drawings. FIG. 3 illustrates a configuration example of a network system according to the present example embodiment.

As illustrated in FIG. 3, network system 1 according to the present example embodiment includes analysis device 100, a plurality of communication terminals 200, network monitoring device 300, and external device 400. The devices are all communicably connected to each other via network 2. Note that network 2 may be a wired network or a wireless network. Network 2 is, for example, a local network in an organization for which incident handling becomes necessary, but may be any other network.

External device 400 is an incident detection device that detects (senses) occurrence of an incident in network 2. When detecting occurrence of an incident, external device 400 notifies analysis device 100 of alert including information of communication terminal 200 as an occurrence source of an incident, a classification of the incident, and the like. External device 400 may detect that an incident has already occurred, or may detect an event indicating a high possibility of occurrence of an incident (an event related to occurrence of an incident). For example, external device 400 is a security device such as an intrusion detection system (IDS), an intrusion prevention system (IPS), a firewall (FW), or the like.

Communication terminal 200 is a terminal device that performs any communication via network 2, and is a personal computer or the like, for example. Communication terminal 200 acquires information of communication terminal 200 such as a log and the like in accordance with an instruction from analysis device 100, and sends the acquired information to analysis device 100. In order to implement the present example embodiment, communication terminal 200 includes, as one example, terminal information acquisition unit 201, terminal information storage unit 202, operation setting unit 203, and terminal information transmission unit 204.

Terminal information acquisition unit 201 acquires behavior and a log in the communication terminal, based on an operation setting held by operation setting unit 203, and records the acquired information in terminal information storage unit 202. Terminal information storage unit 202 holds (stores) the behavior and the log acquired by terminal information acquisition unit 201. Operation setting unit 203 receives an operation setting from analysis device 100, and holds (sets) the received operation setting. Based on the operation setting held by operation setting unit 203, terminal information transmission unit 204 transmits the information held by terminal information storage unit 202, to analysis device 100.

Network monitoring device 300 is a monitoring device that monitors information flowing in network 2. Network monitoring device 300 may be a dedicated monitoring device, or may be implemented by a general-purpose device such as a personal computer or the like. Network monitoring device 300 acquires information of network 2 in accordance with an instruction from analysis device 100, and transmits the acquired information to analysis device 100. In order to implement the present example embodiment, network monitoring device 300 includes, as one example, communication information acquisition unit 301, communication information storage unit 302, operation setting unit 303, and communication information transmission unit 304.

Communication information acquisition unit 301 acquires communication information of connected network 2, based on a setting held by operation setting unit 303, and records the acquired information in communication information storage unit 302. Communication information acquisition unit 301 may transmit the acquired information to analysis device 100. Communication information storage unit 302 holds (stores) behavior and a log acquired by communication information acquisition unit 301. Operation setting unit 303 receives an operation setting from analysis device 100, and holds (sets) the received operation setting. Based on the operation setting held by operation setting unit 303, the communication information transmission unit 304 transmits the information held by communication information storage unit 302 to analysis device 100.

Analysis device 100 is a device for analyzing (triaging) an incident that has occurred, and is also an incident effect range estimation device estimating an extent of influence of the incident. Analysis device 100 may be a dedicated analysis device, or may be implemented by a general-purpose device such as a personal computer or the like. Analysis device 100 sets a log acquisition method (operation) in each of the communication devices, and estimates an extent of influence of an incident, based on a collected log. Note that analysis device 100, network monitoring device 300, and external device 400 are each described as a separate device, but may be implemented by one or any number of devices.

In order to implement the present example embodiment, analysis device 100 includes, as one example, alert reception unit 101, log reception unit 102, log storage unit 103, log analysis unit 104, log-collection-setting storage unit 105, communication destination specifying unit 106, operation setting instruction unit 107, recursive-processing-end determination unit 108, score calculation unit 109, and presentation unit 110. Note that these functional blocks are merely one example, and a different configuration may be adopted as long as the operation according to the present example embodiment described below can be implemented.

Alert reception unit 101 receives an alert from external device 400 and an input from an analyst. Alert reception unit 101 receives an IP address of an incident-occurrence-source terminal, a classification of an incident, and the like, for example. The log reception unit (log acquisition unit) 102 receives information transmitted from communication terminal 200 and network monitoring device 300, and records the received information in a terminal log storage unit. Log storage unit 103 holds (stores) the information received by log reception unit 102. Note that it can be said that in the present example embodiment, in order to acquire log information of an occurrence source device related to occurrence of an incident and further recursively acquire log information of a communication destination device being the communication destination, log reception unit 102 is configured as follows. For example, log reception unit 102 (and operation setting instruction unit 107) includes an occurrence-source-log acquisition unit that acquires log information of the occurrence source device, and log reception unit 102 includes a communication-destination-log acquisition unit that acquires log information of the communication destination device (and a further next communication destination).

Figure 4:
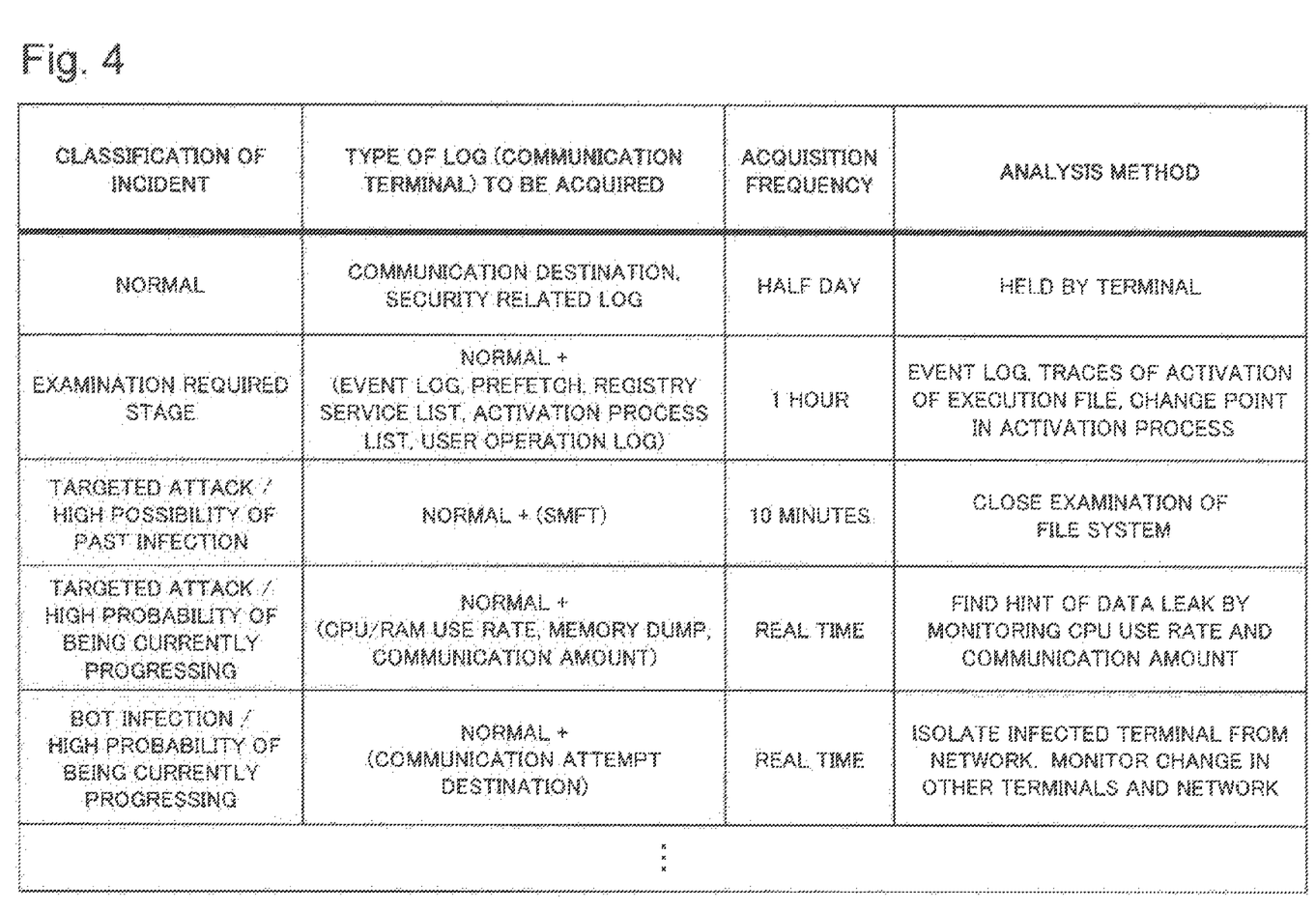
FIG. 4 is a diagram illustrating an example of a table used in the network system according to the example embodiment 1 of the present invention.

Log analysis unit 104 analyzes information log in accordance with a log analysis method held by log-collection-setting storage unit 105. Log-collection-setting storage unit 105 holds information (a log analysis table). In this information, classification of an incident (information security incident), type of a log to be collected, collection frequency of the log, and an analysis method of the log are associated with each other. FIG. 4 illustrates a specific example of the held log analysis table. In this example, incidents are classified into five classes of "normal", "examination required stage", "targeted attack/high possibility of past infection", "targeted attack/high probability of being currently progressing", and "bot infection/high probability of being currently progressing". The type, the acquisition frequency, and the analysis method of a log are set for each of the classifications (types of incidents).

Upon receiving an analyzed result of log analysis unit 104, communication destination specifying unit 106 outputs (specifies) terminal information (an IP address and the like) of a communication destination with which an analysis target terminal has communicated. Upon receiving a specified result of communication destination specifying unit 106, operation setting instruction unit 107 transmits an operation setting instruction to a target terminal group in accordance with an operation setting (type and acquisition frequency of a log) held by log-collection-setting storage unit 105. Recursive-processing-end determination unit 108 receives the analyzed result of log analysis unit 104, and calculates whether or not the analyzed result matches an end condition of recursive processing. When the analyzed result matches the end condition, recursive-processing-end determination unit 108 stops the recursive processing, and outputs a communication destination list to score calculation unit 109.

In accordance with the communication destination list received from recursive-processing-end determination unit 108, score calculation unit 109 constructs a graph (communication graph) and calculates a score for each of communication terminals 200. Presentation unit 110 outputs (displays) the communication graph generated by score calculation unit 109, and a list of the terminals arranged in ascending order of the scores. In the graph, an incident occurrence source device and a communication destination device thereof (and a further next communication destination device) are assumed to be nodes. Note that it can be said that in the present example embodiment, in order to estimate an extent of influence of an incident by generation of a graph and calculation of scores, score calculation unit 109 is configured as follows. For example, it can be said that score calculation unit 109 (and log analysis unit 104) is an effect range estimation unit that estimates an extent of influence of an incident, based on (repeatedly acquired) log information of a communication destination.

Figure 5:
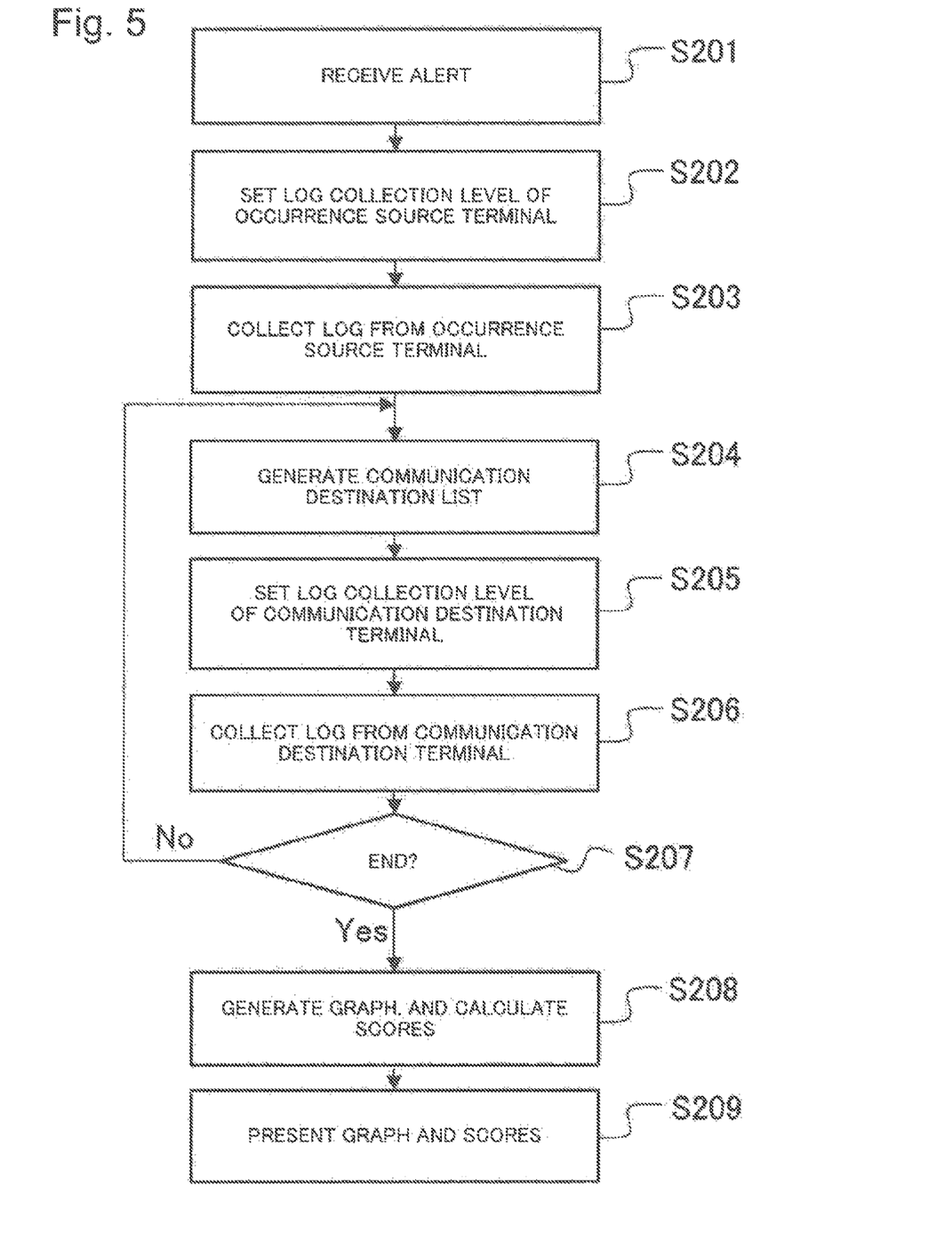
FIG. 5 is a flowchart illustrating an operation of the network system according to the example embodiment 1 of the present invention.

Next, an incident effect range estimation operation according to the present example embodiment is described with reference to FIG. 5 and FIG. 6. FIG. 5 illustrates a flow of this operation, and FIG. 6 illustrates a flow of processing in blocks of each of the devices.

First, in a normal state before occurrence of an incident, in communication terminal 200, terminal information acquisition unit 201 collects a log necessary for examination of a trace of an attack, at regular time intervals, and stores the collected log in terminal information storage unit 202 in communication terminal 200. In network monitoring device 300, communication information acquisition unit 301 acquires a traffic log, and stores the acquired log in communication information storage unit 302 in network monitoring device 300.

Figure 6:
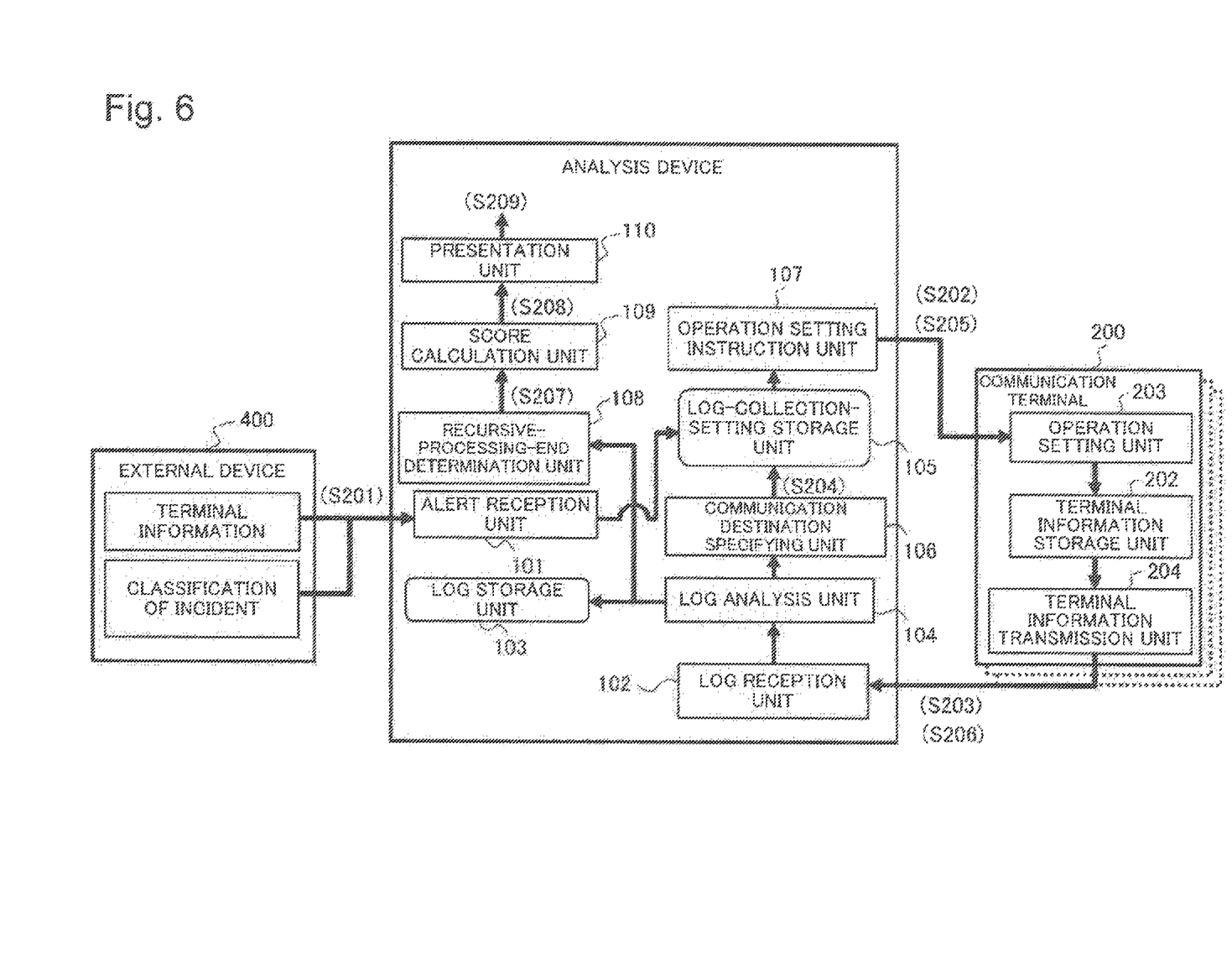
FIG. 6 is a diagram illustrating a flow of processing of the network system according to the example embodiment 1 of the present invention.

As illustrated in FIG. 5 and FIG. 6, when external device 400 detects an incident, analysis device 100 receives an alert from external device 400 (S201). The alert may be received from external device 400, or an analyst or the like may input information concerning an incident via another input device. When detecting some threat, external device 400 classifies a type of the incident and transmits, to analysis device 100, an IP address of the terminal of the threat source (occurrence source) and a type (corresponding to the classification of FIG. 4) of the incident. For example, alert reception unit 101 of analysis device 100 receives an alert in which an IP address of the detection source terminal is "A", and a classification of an incident is "examination required stage".

Subsequently, analysis device 100 sets a log collection level of the alert occurrence source terminal (occurrence source terminal) (S202). When analysis device 100 receives an alert from external device 400 or an input from the input device, analysis device 100 transmits an instruction. The instruction is to change, depending on the classification of the incident, a log collection level (type) and a log transmission frequency of communication terminal 200 for which the alert has occurred and network monitoring device 300. Further, the instruction is to transmit, to analysis device 100, a log of communication terminal 200.

For example, the IP address notified by the alert is "A", and the type of the incident is "examination required stage". For this reason, based on the setting of log-collection-setting storage unit 105, operation setting instruction unit 107 of analysis device 100 transmits an instruction to operation setting unit 203 of communication terminal 200 (hereinafter, written as "200A") with the IP address "A". The instruction is to transmit, to analysis device 100, an acquisition target log (in the example of FIG. 4, "normal (communication destination and a security related log) +(an event log, prefetch, registry, a service list, an activation process list, and a user operation log)") associated with the type "examination required stage" of the incident. At the same time, operation setting instruction unit 107 of analysis device 100 transmits an instruction to operation setting unit 203 of communication terminal 200A. The instruction is to change the setting to the log acquisition frequency (in the example of FIG. 4, one hour) associated with the type "examination required stage" of the incident.

Subsequently, analysis device 100 collects a log from the alert occurrence source terminal (occurrence source terminal) (S203). Communication terminal 200 and network monitoring device 300 that have received the instruction from analysis device 100 change the log collection level and transmit a log held by each of the devices, to analysis device 100.

For example, in communication terminal 200A, when the instruction from analysis device 100 is received as described above, terminal information acquisition unit 201 stores a log in terminal information storage unit 202. Then, terminal information transmission unit 204 transmits, to log reception unit 102 of analysis device 100, the set acquisition target log (e.g., a communication destination, change point record, a security log, an event log, prefetch, registry, a service list, an activation process list, and a user operation log) at the changed log acquisition frequency (e.g., at one-hour intervals). Note that the acquisition target log generated by communication terminal 200A after the present processing is also periodically transmitted to analysis device 100 at the log acquisition frequency.

Subsequently, analysis device 100 generates a communication destination list (S204). Analysis device 100 analyzes the received log, accordingly to the type of the incident, and generates a list of communication destinations considered to be under an extent of influence of the same incident. Note that, at this time, a communication period and a session time may be additionally and arbitrarily set.

For example, in analysis device 100, log reception unit 102 stores, in log storage unit 103, the log transmitted from communication terminal 200A. Further, in analysis device 100, log analysis unit 104 analyzes the log (may analyze the log accordingly to the classification of the incident). Communication destination specifying unit 106 extracts IP addresses limited to the communication terminals belonging to an intra-organization network, from the communication destinations in the log acquired by communication terminal 200A. Then, communication destination specifying unit 106 sets the extracted IP addresses as the communication destination list. With global IP addresses being excluded, local IP addresses may be extracted as the communication destinations. For example, communication destination specifying unit 106 extracts IP addresses "B" and "C" as communication destinations of the IP address "A".

Subsequently, analysis device 100 sets a log collection level of the communication destination terminals (S205). As with S202, analysis device 100 transmits an instruction. The instruction is to change, depending on the classification of the incident, a log collection level and a log transmission frequency of each communication terminal 200 included in the communication destination list and network monitoring device 300. Further, the instruction is to transmit a log of each communication terminals 200 to analysis device 100.

For example, in analysis device 100, operation setting instruction unit 107 transmits instructions to communication terminal 200 (hereinafter, written as 200B) whose IP address described in the communication destination list is "B" and communication terminal 200 (hereinafter, written as 200C) whose IP address described in the communication destination list is "C". One of the instructions is to transmit, to analysis device 100, the acquisition target log (e.g., a communication destination and the like as with the above) associated with the type of the incident. The other instruction is to change a setting to the log acquisition frequency (e.g., one hour as with the above).

Subsequently, analysis device 100 collects logs from the communication destination terminals (S206). As with S203, communication terminals 200 and network monitoring device 300 that have received the instructions from analysis device 100 change a collection level of logs, and transmit, to analysis device 100, a log stored by each of the devices.

For example, in analysis device 100, log reception unit 102 stores, in log storage unit 103, logs transmitted from communication terminals 200B and 200C. Further, log analysis unit 104 of analysis device 100 analyzes the logs stored in log storage unit 103, in accordance with the analysis method (an event log, traces of activation of an execution file, and a change point of an activation process in the case of "examination required stage" in the example of FIG. 4). The analysis method is set, depending on the classification of the incident, in log-collection-setting storage unit 105. Log analysis unit 104 transmits the analyzed result to recursive-processing-end determination unit 108.

The above-described processing is performed recursively, and the processing of S204 to S206 is repeated until the end condition is satisfied (S207). As the recursive processing end condition, for example, the following two types of conditions can be set.

The processing of S204 to S206 is cycled n times (n is any natural number).

For the list of the communication destinations of the processing target terminal, all the communication weighted scores become equal to or smaller than a threshold value. The communication weighted scores (weights related to communication) are acquired by a weighting algorithm that takes into account factors such as a communication destination, a communication amount, a communication frequency, and a communication protocol. For example, the weighting may be performed based on change points, change rates, and the like of each factor.

In the case of continuing the recursive processing, the steps S204 to S206 are further performed, and logs of the communication destination terminals of communication terminals 200B and 200C are further collected. Meanwhile, when the recursive processing is ended, analysis device 100 generates a communication graph, calculates a score (priority level) for each of the communication terminals (S208), and presents (outputs) the graph and the scores (S209).

Based on a group of the terminals included in the repeatedly specified communication destination list, score calculation unit 109 generates an undirected or directed graph. In the graph, the terminals (IP addresses) are set as nodes, and communication paths between the terminals are set as undirected edges or directed edges. Based on the structure of the generated graph, score calculation unit 109 assigns a score (priority levels) to each of the nodes (terminals) in the graph by using an algorithm such as centrality, community clustering, or the like. Score calculation unit 109 may assign a score on a basis of other information (the log analyzed result, the communication weighting, or the like) acquired from the log, without the basis being limited to the structure of the graph. Presentation unit 110 presents the graph as an incident effect range, and presents the terminals by listing the terminals in descending order of the scores.

Figure 7:
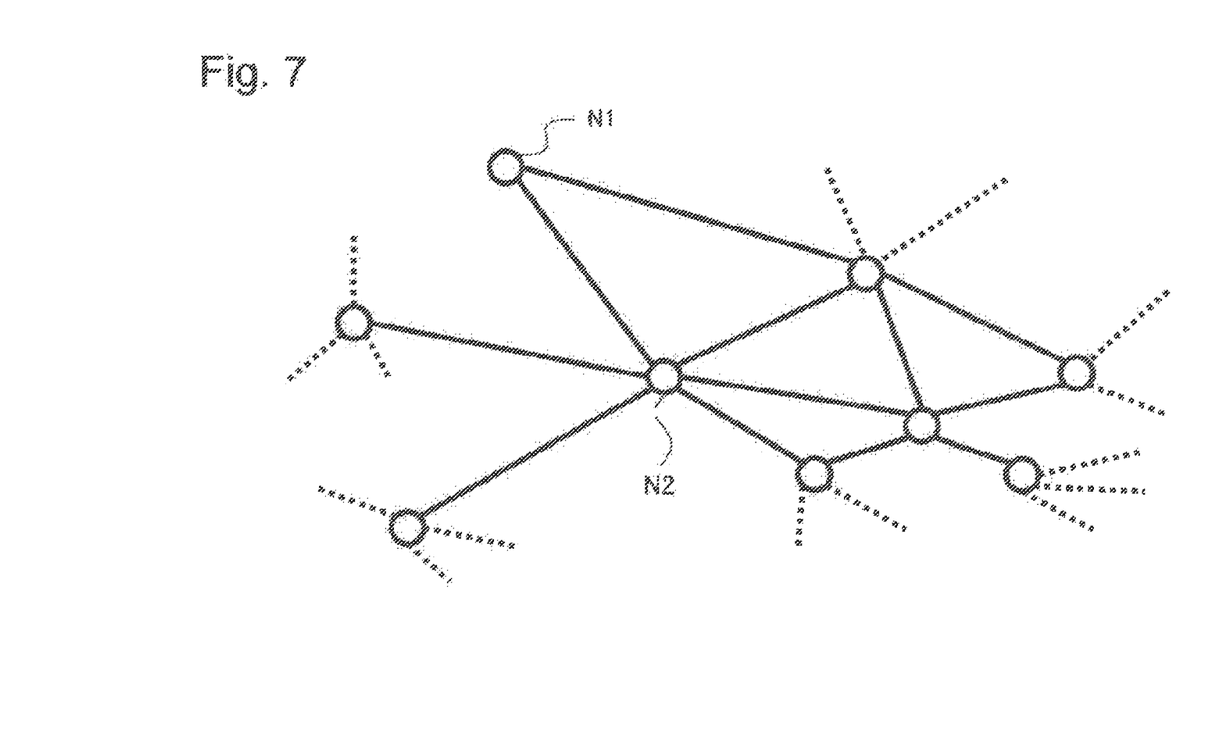
FIG. 7 is a diagram illustrating an example of a graph generated by the network system according to the example embodiment 1 of the present invention.

FIG. 7 illustrates an image of the graph generated by score calculation unit 109. For example, presentation unit 110 displays, on a screen, the graph as illustrated in FIG. 7 and the list of the terminals with the scores assigned thereto. For example, each of the nodes in the graph may be displayed by color or size depending on the score.

For example, node N1 is a node with the smallest order, and node N2 is a node with the highest order in the communication destination graph. It is expected that node N1 with a small order is a server or a client accessed by users limited by access restriction or the like. For this reason, a priority level of node N1 is set to be low. In contrast, there is a high possibility that node N2 with a high order is a general shared-file server. For this reason, a priority level of node N2 is set to be high.

Figure 8:
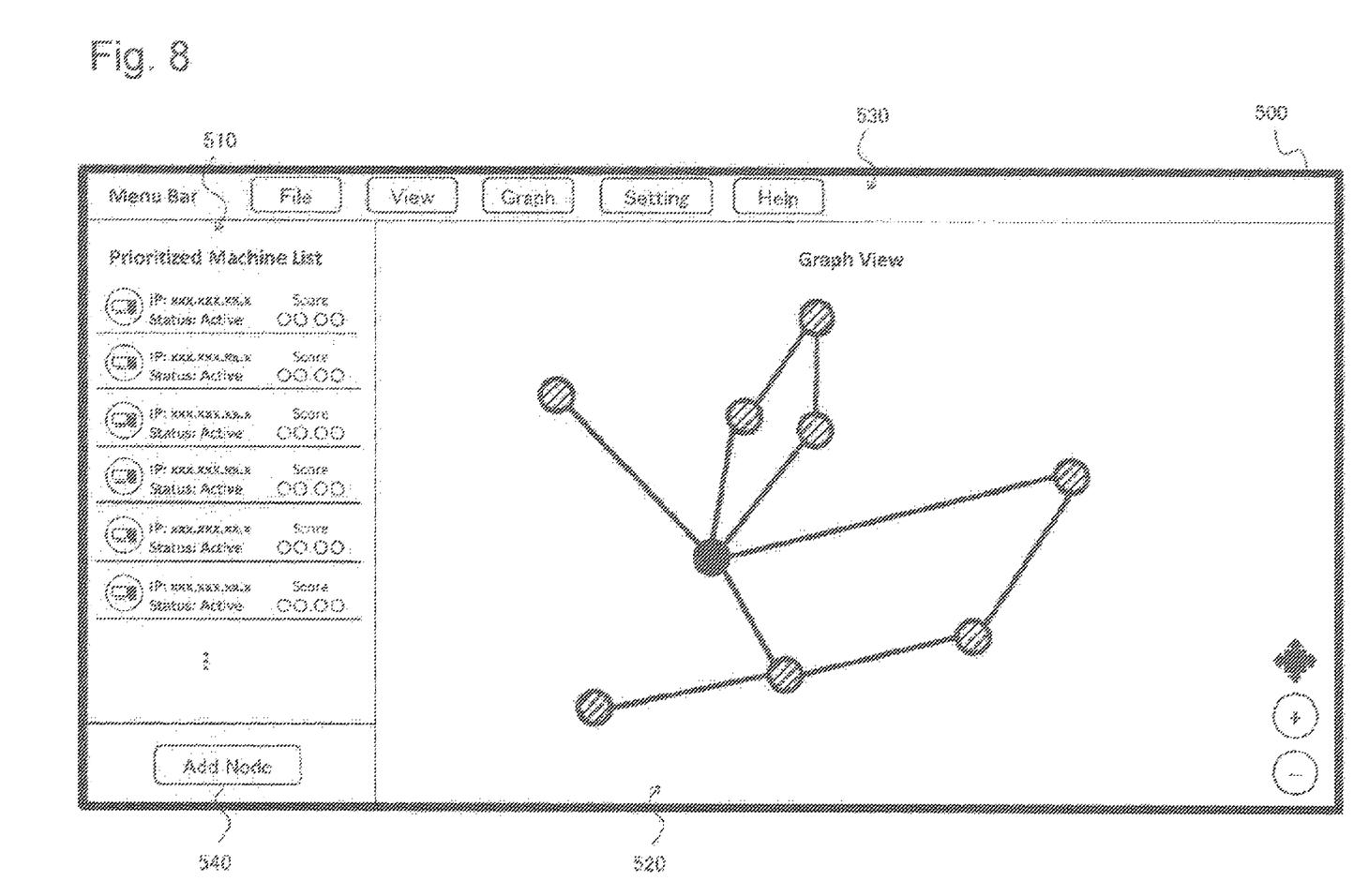
FIG. 8 is a diagram illustrating an example of a GUI displayed by the network system according to the example embodiment 1 of the present invention.

FIG. 8 and FIG. 9 illustrate specific examples of a graphical user interface (GUI) displayed (presented) by presentation unit 110. As illustrated in FIG. 8, presentation unit 110 displays effect range presentation window 500 on the screen. In effect range presentation window 500, for example, terminal list display area 510 is displayed on the left side, and graph display (graph view) area 520 is displayed on the right side. In terminal list display area 510, information of the terminals (communication terminals) is displayed in descending order of the scores, and, as information of each of the terminals, the IP address, a state (active or the like), and the score are displayed, for example. In graph display area 520, a graph similar to that in FIG. 7 is displayed. For example, the node with the highest score is displayed by the deepest color. In addition, menu bar 530 is displayed at an upper part in effect range presentation window 500, and node addition button 540 is displayed at a lower part in terminal list display area 510. In menu bar 530, various buttons necessary for operating effect range presentation window 500 are displayed. Node addition button 540 is a button for an analyst to add any terminal as a node in the graph and the terminal list.

Figure 9:
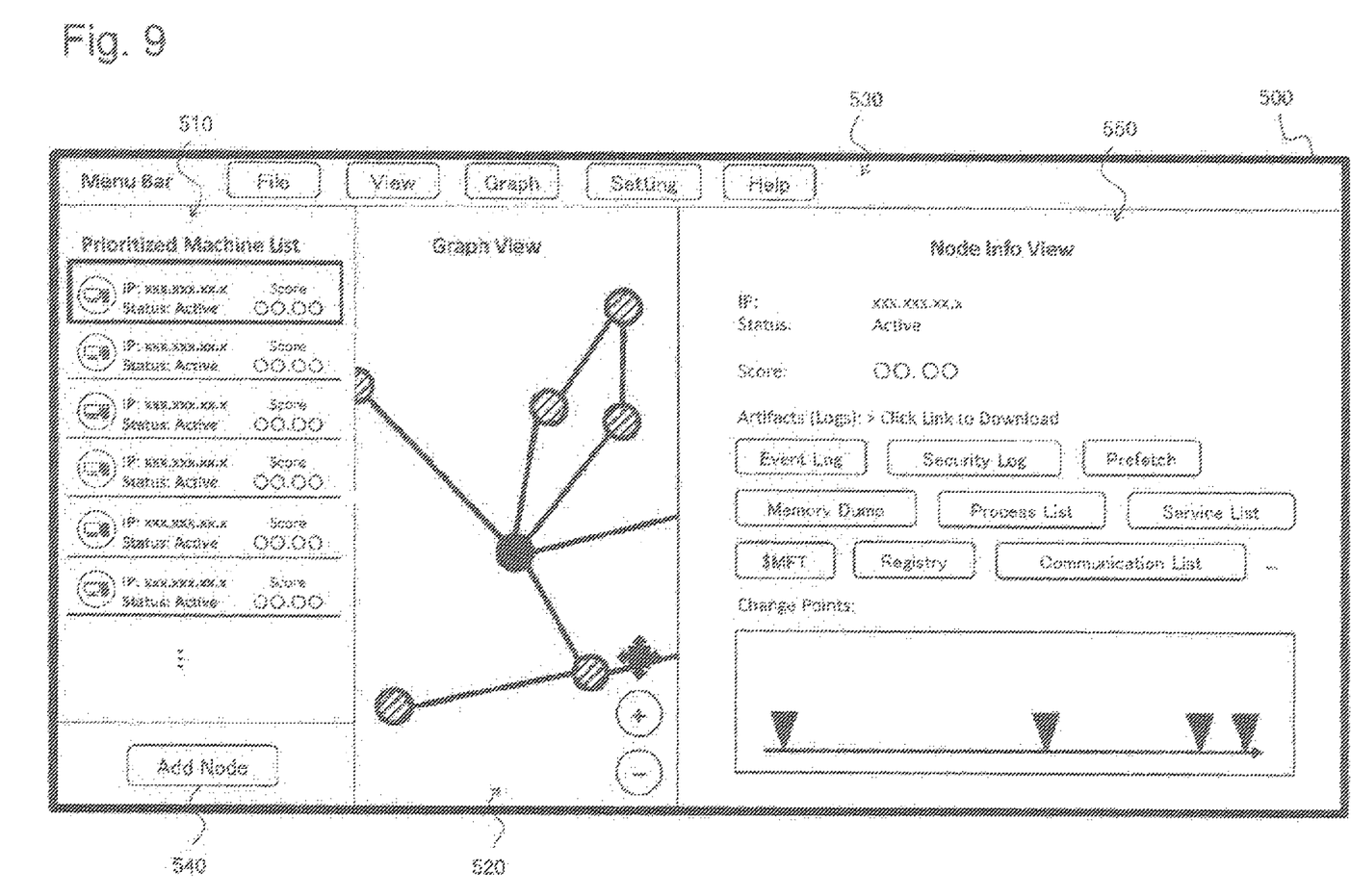
FIG. 9 is a diagram illustrating an example of a GUI displayed by the network system according to the example embodiment 1 of the present invention.

Further, as illustrated in FIG. 9, when a terminal (node) is selected from the terminal list or the graph view, node information display area 550 is displayed, and information of the selected terminal is displayed. In node information display area 550, information such as the acquired log or the like, and the change points as well as the IP address, a state, and the score are displayed. For example, by clicking the displayed log or the like, download can be performed, and further, the log or the like can be analyzed. The change points are calculated when the communication graph is constructed, and are displayed together with a time series. The change point is a trend change point of the log recorded on a terminal side, as a time and a type of the log, and enables grasping of a time point when an effect of an incident appears. For example, the change point is calculated and held on the terminal (communication terminal) side, and is transmitted together with the operation log to the analysis device. By referring to the change points for each of the terminals at the time of constructing the communication graph, it may be determined whether or not the terminal is added as a node to the graph.

As described above, unlike the related technique of collecting logs for a predetermined target, the present example embodiment automatically determines a log collection target by log analysis of the initially input terminal. Then, the present example embodiment recursively performs the analysis operation on the related terminals. In other words, an alert or an input from the external device is used as a trigger to cause a log collection level of the target terminal to be changed and a log to be collected, and the log is analyzed, thereby specifying a group of communication destination terminals. Further, specifying of a group of communication destination terminals, and the processing for the group of communication destination terminals is recursively repeated, and thereby, an extent of influence of an incident is estimated. Furthermore, different logs are acquired depending on a situation based on a classification of an incident, and thereby, information necessary for the analysis is acquired by focusing on the information. Thus, in the present example embodiment, an extent of influence of an incident can be estimated. For this reason, it is possible to promptly present a range of terminals to be examined by an analyst, and a basis necessary for determination of initial-stage handling, and to shorten time taken for incident handling.

The present example embodiment solves the issue that it takes too much time for triage (in incident handling), to which attention has not been paid so far. In the related technique, a log can be acquired from any terminal, but in the first place, it is unclear from which terminal a log is to be acquired. Further, because of nature of work as triage, urgency is required. For this reason, it is impractical to examine all terminals and all collected logs. While the related technique focuses on preservation of a log, the example embodiment focuses on a phase at which a log is analyzed and examined. In other words, the present example embodiment is characterized in "implementing selection of a terminal on which analysis of a log is considered to be necessary, and implementing selection of an analysis target log using knowledge on an incident". In the present example embodiment, a log necessary for incident handling is acquired from a necessary terminal, and a priority order of the terminal to be dealt with is calculated from a graph structure and the acquired log. Thereby, the above-described issue can be resolved.

Other Example Embodiments

The configuration of the network system illustrated in FIG. 3 is merely one example, and any device (function) can be added or changed.

For example, a web proxy server or a local DNS server may be combined with the configuration of FIG. 3. In the example embodiment 1, since a graph is constructed for an intra-organization network, only nodes (communication terminals) communicating in the local network are targeted. A web proxy server or a local DNS server is combined, and a log of the Web proxy server or a log of the DNS server is input to an analysis terminal. Thereby, an external URL or an external IP address with which an alert detection terminal has communicated can be added as a node to a communication graph. Thereby, a group of terminals that are not connected by edges in intra-organization communication can be introduced into the communication graph. For example, a node accessing a specific C2 server (command and control server) and a node requesting name resolution can be further extracted.

Further, in the configuration of FIG. 3, a log storage location of each device may be changed. According to the example embodiment 1, in a prerequisite configuration, the communication terminals have storage capacity enough to store logs generated by processing inside the terminals. However, in a communication terminal of a type represented by an incorporated terminal, there is not capacity for storing logs. For this reason, a log storage terminal for distinguishing and holding logs for each terminal is prepared separately in a network. Then, a setting is made in such a manner that the communication terminals transmit generated logs to the log storage terminal, whereby the example embodiment 1 can be used. Furthermore, this facilitate application to an Internet-of-things (IoT) system.

Note that the present invention is not limited to the above-described example embodiments, and can be appropriately changed without departing from the essence.

Each configuration in the above-described example embodiment is made by hardware or software, or both thereof, and may be made by one piece of hardware or software, or may be made by a plurality of pieces of hardware or software. Each function (each processing) in the example embodiment may be implemented by a computer including a CPU, a memory, and the like. For example, a program for performing a method (processing) in the example embodiment may be stored in a storage device (storage medium), and each function may be implemented by executing the program stored in the storage device by the CPU.

Such a program can be stored by using various types of non-transitory computer readable media, and be supplied to the computer. The non-transitory computer readable media include various types of tangible storage media. Examples of the non-transitory computer readable medium include a magnetic recording medium (e.g., a flexible disk, a magnetic tape, or a hard disk drive), a magneto-optical recording medium (e.g., a magneto-optical disk), a CD-ROM (read only memory), a CD-R, a CD-R/W, a semiconductor memory (e.g., a mask ROM, a programmable ROM (PROM), an erasable PROM (EPROM), a flash ROM, and a random access memory (RAM)). The program may be supplied to the computer by various types of transitory computer readable media. Examples of the transitory computer readable medium include an electrical signal, an optical signal, and an electromagnetic wave. The transitory computer readable medium can supply the program to the computer via a wired communication path such as an electric wire, an optical fiber, or the like, or a wireless communication path.

REFERENCE SIGNS LIST

1 Network system
2 Network
10 Incident effect range estimation device
11 Occurrence-source-log acquisition unit
12 Communication-destination-log acquisition unit
13 Effect range estimating unit
20 Occurrence source device
21 Communication destination device
100 Analysis device
101 Alert reception unit
102 Log reception unit
103 Log storage unit
104 Log analysis unit
105 Log-collection-setting storage unit
106 Communication destination specifying unit
107 Operation setting instruction unit
108 Recursive-processing-end determination unit
109 Score calculation unit
110 Presentation unit
200 Communication terminal
201 Terminal information acquisition unit
202 Terminal information storage unit
203 Operation setting unit
204 Terminal information transmission unit
300 Network monitoring device
301 Communication information acquisition unit
302 Communication information storage unit
303 Operation setting unit
304 Communication information transmission unit
400 External device

The invention claimed is:

1. An incident effect range estimation device comprising:
a processor; and
a memory having stored therein computer instruct ions, wherein the processor executes the instruct ions to:
acquire log information of an occurrence source device related to occurrence of an incident;
acquire, based on the log information of the occurrence source device, log information of a communication destination device being a communication destination of the occurrence source device;
acquire, based on the log information of a communication destination device acquired, log information of a next communication destination device being a next communication destination;
calculate, based on the log information acquired, a weight score related to communication for each communication destination device, the weight score calculated based on at least one of; a change point of the communication destination, a change point of a communication protocol, a change rate of a communication amount, and a change rate of a communication frequency;
recursively repeat acquisition of the log information of the next communication destination device until the weight score calculated for the next communication destination device becomes equal to or smaller than a threshold value; and
estimate an extent of influence of the incident, based on the log information of the communication destination device and the log information of the next communication destination device acquired.

2. The incident effect range estimation device according to claim 1, wherein
in the acquiring log information of a communication destination device, repeating acquisition of log information of the next communication destination device a predetermined number of times.

3. The incident effect range estimation device according to claim 2, wherein in the acquiring log information of an occurrence source device and in the acquiring log information of a communication destination device, acquiring log information according to a type of the incident.

4. The incident effect range estimation device according to claim 2, wherein in the estimating, generating a graph in which the occurrence source device and the communication destination device are nodes.

5. The incident effect range estimation device according to claim 1, wherein
in the acquiring log information of an occurrence source device and in the acquiring log information of a communication destination device, acquiring log information according to a type of the incident.

6. The incident effect range estimation device according to claim 5, wherein in the estimating, generating a graph in which the occurrence source device and the communication destination device are nodes.

7. The incident effect range estimation device according to claim 1, wherein
in the estimating, generating a graph in which the occurrence source device and the communication destination device are nodes.

8. The incident effect range estimation device according to claim 7, wherein
in the estimating, determining a priority level of the node, based on a structure of the generated graph.

9. The incident effect range estimation device according to claim 8, wherein
in determining a priority level of the node, based on centrality of the nodes.

10. The incident effect range estimation device according to claim 8, wherein
in determining a priority level of the node, based on community clustering of nodes.

11. The incident effect range estimation device according to claim 7, wherein
in generating the graph, determining whether to add the communication destination device as nodes based on a time of the change point of the log information.

12. An non-transitory computer readable incident effect range estimation method in an incident effect range estimation device, the method comprising, by the incident effect range estimation device:
- acquiring log information of an occurrence source device related to occurrence of an incident;
- acquiring, based on the log information of the occurrence source device, log information of a communication destination device being a communication destination of the occurrence source device;
- acquiring, based on the log information of a communication destination device acquired, log information of a next communication destination device being a next communication destination;
- calculating, based on the log information acquired, a weight score related to communication for each communication destination device, the weight score calculated based on at least one of: a change point of the communication destination, a change point of a communication protocol, a change rate of a communication amount, and a change rate of a communication frequency;
- recursively repeating acquisition of the log information of the next communication destination device until the weight score calculated for the next communication destination device becomes equal to or smaller than a threshold value; and
- estimating an extent of influence of the incident, based on the log information of the communication destination device and the log information of the next communication destination device acquired.

13. A non-transitory computer readable storage medium storing therein an incident effect range estimation program for causing a computer to perform incident effect range estimation processing, the incident effect range estimation processing including:
- acquiring log information of an occurrence source device related to occurrence of an incident;
- acquiring, based on the log information of the occurrence source device, log information of a communication destination device being a communication destination of the occurrence source device;
- acquiring, based on the log information of a communication destination device acquired, log information of a next communication destination device being a next communication destination;
- calculating, based on the log information acquired, a weight score related to communication for each communication destination device, the weight score calculated based on at least one of: a change point of the communication destination, a change point of a communication protocol, a change rate of a communication amount, and a change rate of a communication frequency;
- recursively repeating acquisition of the log information of the next communication destination device until the weight score calculated for the next communication destination device becomes equal to or smaller than a threshold value; and
- estimating an extent of influence of the incident, based on the log information of the communication destination device and the log information of the next communication destination device acquired.

\* \* \* \* \*